(12) United States Patent
Ichikawa

(10) Patent No.: US 10,821,996 B2
(45) Date of Patent: *Nov. 3, 2020

(54) MOTOR-DRIVEN VEHICLE

(71) Applicant: TOYOTA JIDOSHA KABUSHIKI KAISHA, Toyota (JP)

(72) Inventor: Koichi Ichikawa, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 342 days.

This patent is subject to a terminal disclaimer.

(21) Appl. No.: 15/876,486

(22) Filed: Jan. 22, 2018

(65) Prior Publication Data

US 2018/0208213 A1    Jul. 26, 2018

(30) Foreign Application Priority Data

Jan. 24, 2017  (JP) ................................. 2017-010294

(51) Int. Cl.
*B60W 50/08* (2020.01)
*B60K 6/445* (2007.10)
(Continued)

(52) U.S. Cl.
CPC ........... *B60W 50/085* (2013.01); *B60K 6/445* (2013.01); *B60W 10/06* (2013.01); *B60W 10/08* (2013.01); *B60W 10/30* (2013.01); *B60W 20/13* (2016.01); *B60W 2050/0062* (2013.01); *B60W 2050/0077* (2013.01); *B60W 2510/244* (2013.01); *B60W 2540/043* (2020.02); *B60W 2710/244* (2013.01); *Y02T 10/6286* (2013.01); *Y02T 10/7005* (2013.01); *Y02T 10/7077* (2013.01); *Y10S 903/93* (2013.01)

(58) Field of Classification Search
USPC ........................................................... 701/22
See application file for complete search history.

(56) References Cited

U.S. PATENT DOCUMENTS 10,279,800 B2 *   5/2019  Ichikawa .............. B60W 20/40
2007/0239992 A1 * 10/2007  White .................. B60K 28/063
                                                        713/186
(Continued)

FOREIGN PATENT DOCUMENTS

JP    2004-147460 A   5/2004
JP    2004-245190 A   9/2004
(Continued)

OTHER PUBLICATIONS

U.S. Appl. No. 15/810,573, filed Nov. 13, 2017.
Notice of Allowance dated Feb. 14, 2019 by the United States Patent Office in U.S. Appl. No. 15/810,573.

*Primary Examiner* — Tyler D Paige
(74) *Attorney, Agent, or Firm* — Sughrue Mion, PLLC

(57) ABSTRACT

A motor-driven vehicle includes a power storage device and a control device configured to perform a restraint process for restraining progress of deterioration of the power storage device when a parameter falls outside a predetermined range. The control device sets the predetermined range to be narrower when a second mode in which a person other than an owner of the vehicle serves as a user is set as an operation mode than when a first mode in which the owner serves as the user is set as the operation mode.

5 Claims, 6 Drawing Sheets

(51) Int. Cl.
*B60W 10/06* (2006.01)
*B60W 20/13* (2016.01)
*B60W 10/30* (2006.01)
*B60W 10/08* (2006.01)
*B60W 50/00* (2006.01)

(56) References Cited

U.S. PATENT DOCUMENTS

| | | | |
|---|---|---|---|
| 2008/0228365 A1* | 9/2008 | White | B60R 25/252 |
| | | | 701/70 |
| 2008/0275644 A1 | 11/2008 | Macneille et al. | |
| 2010/0235026 A1* | 9/2010 | Shimizu | B60R 25/25 |
| | | | 701/22 |
| 2011/0082625 A1* | 4/2011 | Miller | B60R 25/00 |
| | | | 701/45 |
| 2015/0046011 A1 | 2/2015 | Imai et al. | |
| 2016/0264124 A1 | 9/2016 | Hotta | |
| 2017/0004712 A1* | 1/2017 | Yang | G06Q 50/30 |
| 2018/0154885 A1* | 6/2018 | Ichikawa | B60W 20/13 |
| 2018/0208213 A1* | 7/2018 | Ichikawa | B60W 10/30 |

FOREIGN PATENT DOCUMENTS

| | | |
|---|---|---|
| JP | 2008-201165 A | 9/2008 |
| JP | 2014-169059 A | 9/2014 |
| JP | 2016-165918 A | 9/2016 |
| WO | 2013145104 A1 | 10/2013 |

* cited by examiner

MOTOR-DRIVEN VEHICLE

INCORPORATION BY REFERENCE

The disclosure of Japanese Patent Application No. 2017-010294 filed on Jan. 24, 2017 including the specification, drawings and abstract is incorporated herein by reference in its entirety.

BACKGROUND

1. Technical Field

The present disclosure relates to a motor-driven vehicle, and more particularly, to a motor-driven vehicle in which an operation mode can be set to any one of a first mode in which an owner of the vehicle serves as a user of the vehicle and a second mode in which a person other than the owner of the vehicle serves as the user of the vehicle.

2. Description of Related Art

Japanese Unexamined Patent Application Publication No. 2014-169059 (JP 2014-169059 A) discloses a motor-driven vehicle in which an operation mode can be selectively set to any one of an owner mode and a car-sharing mode. The motor-driven vehicle supports charging of an on-board power storage device with electric power which is supplied from a charging station outside the vehicle (hereinafter referred to as "external charging"). In the motor-driven vehicle, when the car-sharing mode is set as the operation mode, some functions associated with the external charging are restricted. Accordingly, since the power storage device is prevented from being excessively charged/discharged by a person other than the owner in the external charging, deterioration of the power storage device is restrain d (see JP 2014-169059 A).

SUMMARY

In the motor-driven vehicle disclosed in JP 2014-169059 A, deterioration of the power storage device at the time of external charging (when the vehicle is stopping) in the car-sharing mode is restrain d, but deterioration of the power storage device at the time of traveling in the car-sharing mode is not considered. Accordingly, there is a likelihood that the power storage device will deteriorate earlier when a person other than the owner drives the vehicle than when the owner drives the vehicle.

The present disclosure provides a motor-driven vehicle that can restrain deterioration of an on-board power storage device due to driving of a person other than an owner of a vehicle.

According to an aspect of the disclosure, there is provided a motor-driven vehicle that is able to set one of a first mode in which an owner of the vehicle serves as a user and a second mode in which a person other than the owner serves as the user as an operation mode, the motor-driven vehicle including: a power storage device; and a control device configured to perform a restraint process for restraining progress of deterioration of the power storage device when a parameter associated with the progress of deterioration of the power storage device falls outside a predetermined range during traveling of the motor-driven vehicle. The control device sets the predetermined range to be narrower when the second mode is set as the operation mode than when the first mode is set as the operation mode.

In the motor-driven vehicle, the predetermined range in the second mode (the car-sharing mode) is narrower than that in the first mode (the owner mode). Accordingly, in the motor-driven vehicle, since the restraint process for restraining the progress of deterioration of the power storage device can be more easily performed in the second mode than in the first mode, it is possible to restrain deterioration of the power storage device due to driving by a person other than the owner.

In the aspect, the motor-driven vehicle may further include an engine, the parameter may be a required power of the motor-driven vehicle, the restraint process may be a process of activating the engine when the required power exceeds a predetermined power range, and the control device may set the predetermined power range to be narrower when the second mode is set as the operation mode than when the first mode is set as the operation mode.

In the motor-driven vehicle, the predetermined power range is narrower in the second mode than in the first mode. Accordingly, in the motor-driven vehicle, since the engine can be more easily started in the second mode than in the first mode and thus a load on the power storage device is reduced, it is possible to restrain deterioration of the power storage device due to driving by a person other than the owner.

In the aspect, the parameter may be a temperature of the power storage device, the restraint process may be a process of restraining an input/output power of the power storage device when the temperature falls outside a predetermined temperature range, and the control device may set the predetermined temperature range to be narrower when the second mode is set as the operation mode than when the first mode is set as the operation mode.

In the motor-driven vehicle, the predetermined temperature range is narrower in the second mode than in the first mode. Accordingly, in the motor-driven vehicle, since the restraint of the input/output power is started earlier in the second mode than in the first mode and thus a load on the power storage device is reduced, it is possible to restrain deterioration of the power storage device due to driving by a person other than the owner.

In the aspect, the motor-driven vehicle may further include a cooling device configured to cool the power storage device, the parameter may be a temperature of the power storage device, the restraint process may be a process of activating the cooling device when the temperature exceeds a predetermined temperature range, and the control device may set the predetermined temperature range to be narrower when the second mode is set as the operation mode than when the first mode is set as the operation mode.

In the motor-driven vehicle, the predetermined temperature range is narrower in the second mode than in the first mode. Accordingly, in the motor-driven vehicle, since the cooling of the power storage device is started earlier in the second mode than in the first mode and thus a load on the power storage device is reduced, it is possible to restrain deterioration of the power storage device due to driving by a person other than the owner.

In the aspect, the parameter may be an amount of increase of an SOC of the power storage device, the restraint process may be a process of restricting the amount of increase of the SOC within a predetermined range of the amount of increase of the SOC, and the control device may set the predetermined range of the amount of increase of the SOC to be narrower when the second mode is set as the operation mode than when the first mode is set as the operation mode.

In the motor-driven vehicle, the range of the SOC increase of the power storage device is narrower in the second mode than in the first mode. Accordingly, in the motor-driven vehicle, since the SOC increase is restricted earlier in the second mode than in the first mode and thus a likelihood that the power storage device will be in a high SOC state decreases, it is possible to restrain deterioration of the power storage device.

In the aspect, the control device may maintain the predetermined range in the first mode even in the second mode when it is predicted that the number of times in which the parameter falls outside the predetermined range is less when the second mode is set as the operation mode than when the first mode is set as the operation mode.

In the motor-driven vehicle, when it is predicted that the number of times in which the parameter will fall outside the predetermined range is less in the second mode than in the first mode, the predetermined range in the first mode is maintained even in the second mode. Accordingly, in the motor-driven vehicle, a negative influence of excessive protection of the power storage device on operability of the vehicle can be reduced.

According to the present disclosure, it is possible to provide a motor-driven vehicle that can restrain deterioration of an on-board power storage device due to driving of a person other than an owner of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
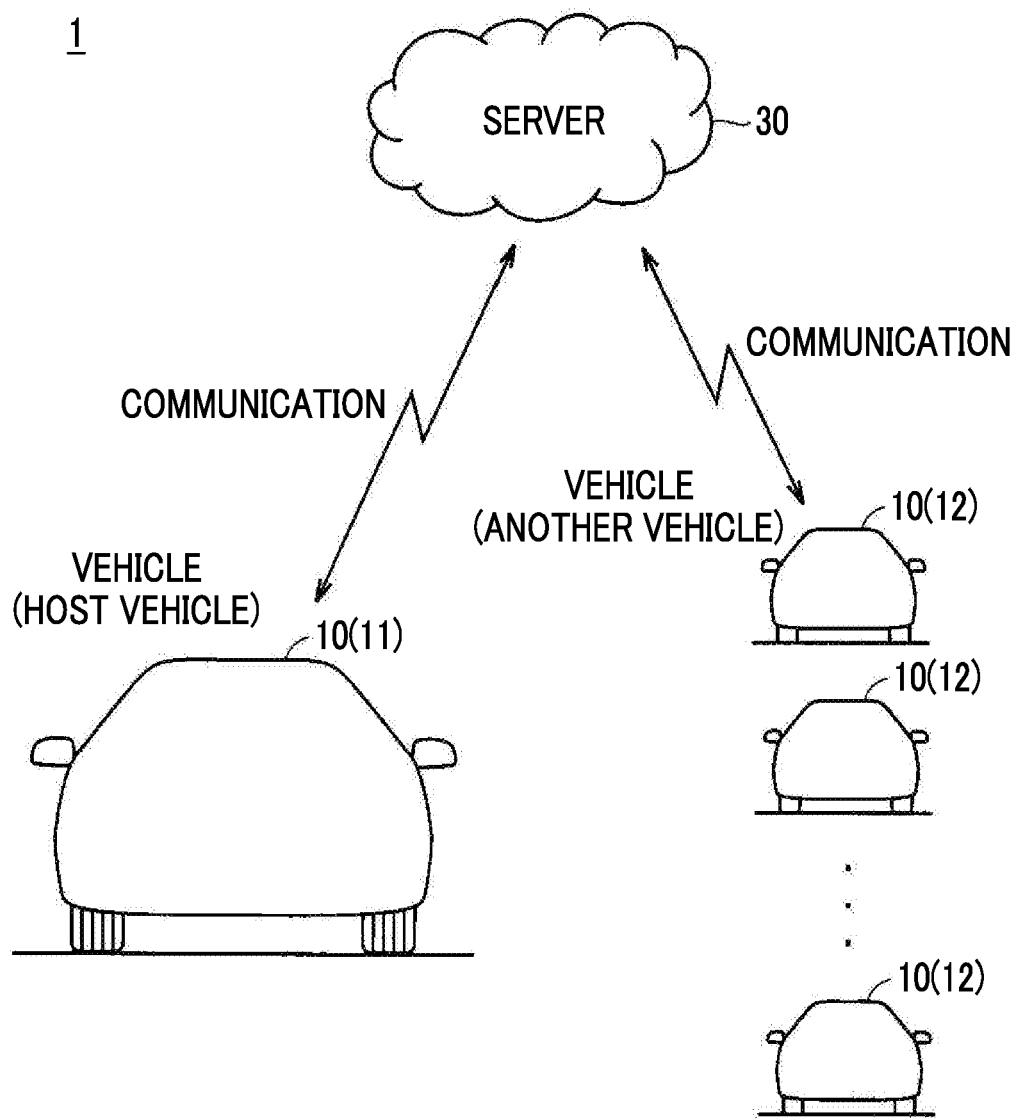
FIG. 1 is a diagram illustrating a configuration of a system.

Hereinafter, embodiments will be described in detail with reference to the accompanying drawings. The same or corresponding elements in the drawings will be referenced by the same reference signs and description thereof will not be repeated.

First Embodiment (Configuration of System)

FIG. 1 is a diagram illustrating a configuration of a system 1 to which a vehicle 10 according to a first embodiment is applied. Referring to FIG. 1, the system 1 includes a plurality of vehicles 10 and a server 30. In the first embodiment, the vehicles 10 are vehicles of the same model. Accordingly, specifications of the vehicles 10 are the same. In the following description, for the purpose of convenience of description, one of the vehicles 10 is also referred to as a "host vehicle 11" and the vehicles 10 other than the host vehicle 11 are also referred to as "other vehicles 12."

The vehicles 10 are connected vehicles which are normally connected to a network during operation of a vehicle system. The vehicles 10 are also plug-in hybrid vehicle (PHV) including a motor and an engine as driving force sources and can support external charging.

Each vehicle 10 is configured to selectively set one of an "owner mode" in which an owner of the vehicle 10 serves as a user and a "car-sharing mode" in which one of a plurality of persons (hereinafter referred to as "sharing users") other than the owner serves as the user as an operation mode.

The car-sharing mode is an operation mode which is applied when a car-sharing system which has rapidly spread in societies is used. The car-sharing system is a system for providing a service of allowing an owner of a vehicle to lend the vehicle to one of the sharing users registered in advance and allowing the sharing user to drive the vehicle of the owner. A representative example of the car-sharing system is "Uber" which is a vehicle allocation system that is operated by Uber Technologies Inc., an American International Technology company.

The vehicles 10 are configured to transmit identifications (IDs) allocated to the vehicles 10, mode information (the owner mode or the car-sharing mode) indicating the operation mode of the vehicles, and result data (for example, data of an SOC, a voltage, a current, and a temperature) indicating operation results of an on-board power storage device to the server 30 at predetermined intervals. The predetermined intervals are predetermined time intervals, for example, time intervals of 15 seconds or 30 seconds.

The server 30 is configured to receive IDs, mode information, and result data from the vehicles 10 at predetermined intervals. In the server 30, a database for managing operation results (such as SOC, voltage, current, and temperature) of the power storage devices in each mode (the owner mode or the car-sharing mode) of the vehicles 10 is formed by collecting the result data of the vehicles 10. Although details will be described later, the server 30 analyzes probability distributions of loads (squares of current values) of the power storage devices in the car-sharing mode, for example, with reference to the result data in the car-sharing mode of the vehicles 10. The server 30 analyzes probability distributions of loads of the power storage devices in the owner mode of the vehicles 10, for example, with reference to the result data in the owner mode of the vehicles 10. In the following description, information indicating the analyzed probability distributions of loads is also referred to as "load distribution information."

Since it is not desirable for an owner that deterioration of the power storage device progresses earlier in the car-sharing mode than when the owner drives the vehicle 10, measures for decreasing a likelihood that such a situation will occur are taken in the vehicles 10. Details thereof will be described later.

Figure 2:
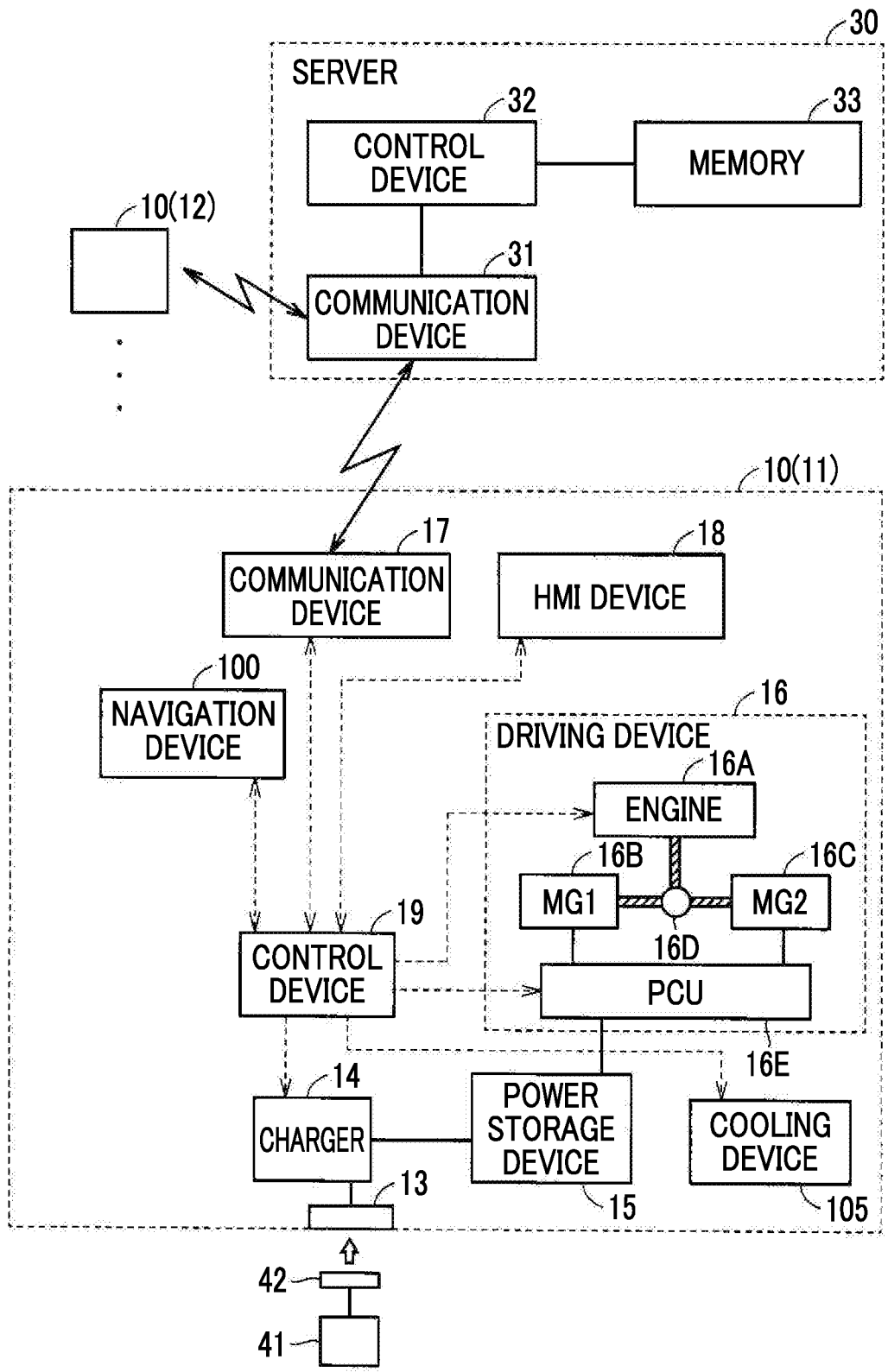
FIG. 2 is a diagram illustrating an example of configurations of a vehicle and a server in more detail.

(Detailed configuration of vehicle and server) FIG. 2 is a diagram illustrating an example of the configurations of the vehicle 10 and the server 30 in more detail. Referring to FIG. 2, the host vehicle 11 includes a charging inlet 13, a charger 14, a power storage device 15, a driving device 16, a communication device 17, a human-machine interface (HMI) device 18, a cooling device 105, and a control device 19. The server 30 includes a communication device 31, a control device 32, and a memory 33.

First, the configuration of the server 30 will be described below. The server 30 is configured to integrate information (such as result data) received from the vehicles 10. The communication device 31 is configured to wirelessly communicate with the communication device 17 of each vehicle 17. The communication device 31 is connected to the control device 32 via a communication line, and transmits information delivered from the control device 32 to the vehicles 10 or delivers information (such as result data) received from the vehicles 10 to the control device 32.

The control device 32 has a CPU which is not illustrated built therein and stores information received from the vehicles 10 in the memory 33. The control device 32 performs various arithmetic operations using information (for example, the database) stored in the memory 33. As described above, the control device 32 analyzes probability distributions of loads (squares of current values) of the power storage devices in the car-sharing mode, for example, with reference to the database stored in the memory 33.

The configuration of each vehicle 10 will be described below. The charging inlet 13 is configured to be connected to a charging connector 42 of power supply equipment 41 outside the vehicle. The charger 14 is disposed between the charging inlet 13 and the power storage device 15, converts external electric power input from the power supply equipment 41 into electric power with which the power storage device 15 is chargeable, and outputs the converted electric power to the power storage device 15.

The power storage device 15 is a secondary battery such as a nickel-hydride battery or a lithium-ion battery which is configured to be rechargeable. The power storage device 15 may be a capacitor with a large capacity.

The driving device 16 generates a driving force of the vehicle 10. The driving device 16 includes an engine 16A, a first motor generator (MG) 16B, a second MG 16C, a power split device 16D, and a power control unit (PCU) 16E.

The engine 16A is an internal combustion engine such as a gasoline engine or a diesel engine. The engine 16A is controlled in accordance with a control signal from the control device 19. Power generated by the engine 16A is split to a path through which the power is transmitted to driving wheels and a path through which the power is transmitted to the first MG 16B by the power split device 16D.

The first MG 16B and the second MG 16C are three-phase AC electrical rotary machines which are driven by the PCU 16E. The first MG 16B generates electric power using the power of the engine 16A which has been split by the power split device 16D. The second MG 16C generates a driving force of the host vehicle 11 using at least one of electric power stored in the power storage device 15 and electric power generated by the first MG 16B. The second MG 16C performs regenerative power generation using kinetic energy of the vehicle 10 which is transmitted from the driving wheels during coast traveling in an accelerator-OFF state (a state in which a user does not depress an accelerator pedal). The regenerative power generated by the second MG 16C is recovered by the power storage device 15.

The power split device 16D includes a planetary gear mechanism that mechanically connects the engine 16A, the first MG 16B, and the second MG 16C.

The PCU 16E converts DC electric power stored in the power storage device 15 into AC electric power which can operate the first MG 16B and the second MG 16C. The PCU 16E also converts AC electric power generated by the first MG 16B and the second MG 16C into DC electric power with which the power storage device 15 is chargeable.

The communication device 17 is configured to wirelessly communicate with the communication device 31 of the server 30. The communication device 17 is connected to the control device 19 via a communication line, and transmits information (the above-mentioned result data and the like) delivered from the control device 19 to the server 30 or delivers information received from the server 30 to the control device 19.

The HMI device 18 is a device that provides a variety of information on the vehicle 10 to a user or receives a user's operation. The HMI device 18 includes a display, a speaker, and the like which are disposed indoor.

A navigation device 100 is a device that guides a user along a route to a destination. The navigation device 100 stores, for example, map information in an internal memory (not illustrated). The navigation device 100 displays a current location of the vehicle 10 on a map using information indicating the current location of the vehicle 10 acquired by a global positioning system (GPS) and the map information.

The cooling device 105 is configured to cool the power storage device 15 and includes, for example, a cooling fan. The cooling device 105 includes a motor which operates using electric power supplied from an auxiliary machine battery (not illustrated) and a fan which is connected to a rotary shaft of the motor (both of which are not illustrated). When the cooling device 105 operates, the fan suctions air in the interior of the vehicle and blows out the suctioned air to the power storage device 15. Accordingly, the power storage device 15 is cooled.

Although not illustrated in the drawing, the vehicle 10 includes a plurality of sensors that detects various physical quantities required for control of the vehicle 10, such as a vehicle speed sensor that detects a vehicle speed, a monitoring sensor that detects a state (such as a voltage, a current, and a temperature) of the power storage device 15, and an acceleration sensor that detects an acceleration of the vehicle 10. The sensors output detection results to the control device 19.

The control device 19 includes a central processing unit (CPU) and a memory which are not illustrated, and controls the devices (such as the charger 14, the driving device 16, the communication device 17, the HMI device 18, and the cooling device 105) of the vehicle 10 based on information stored in the memory or information from the sensors. For example, information indicating whether the owner mode is set as the operation mode of the vehicle 10 or the car-sharing mode is set as the operation mode is stored in the memory in the control device 19. Setting of the operation mode is performed, for example, by allowing an owner of the vehicle 10 to operate the HMI device 18, and the operation mode which has been set once is maintained until the operation mode is changed by the owner in a next time.

The control device 19 generates an engine start command to start (operate) the engine 16A, for example, when a required power for the vehicle 10 is greater than an engine start threshold value during execution of EV traveling in which the vehicle travels with the output of the second MG 16C in a state in which the engine 16A is stopped. The control device 19 controls a throttle opening degree, an ignition time, a fuel injection time, an amount of injected fuel, and the like such that the engine 16A operates at a desired operating point during operation of the engine 16A.

Figure 3:
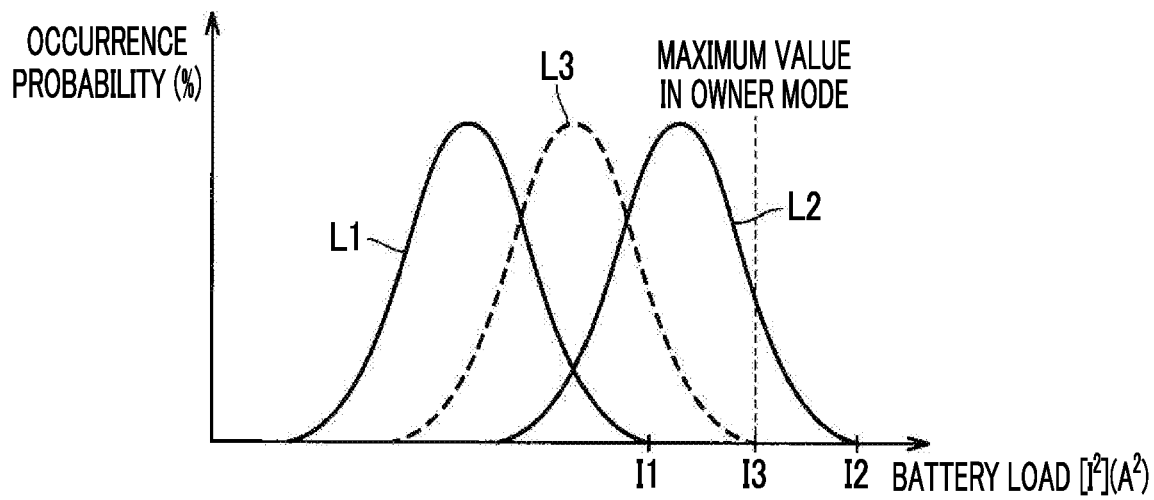
FIG. 3 is a diagram illustrating patterns of a probability distribution of a load of a power storage device.

(Process of restraining deterioration of power storage device in car-sharing mode) FIG. 3 is a diagram illustrating patterns of a probability distribution of a load of the power storage device 15. Referring to FIG. 3, the horizontal axis represents the square of a current value of the power storage device 15 (a load of the power storage device 15), and the vertical axis represents an occurrence probability of the load.

A probability distribution L3 is an example of the probability distribution of the power storage device 15 when the vehicle 10 is in the owner mode. On the other hand, probability distributions L1 and L2 are examples of the probability distribution of the load of the power storage device 15 when the vehicle 10 is in the car-sharing mode.

When the probability distribution of the load of the power storage device 15 in the car-sharing mode is L1, the load of the power storage device 15 can be said to be lower than that in the owner mode. In this case, a likelihood that the power storage device 15 will deteriorate earlier in the car-sharing mode than in the owner mode is low. Accordingly, a likelihood that the owner of the vehicle 10 has a disadvantage equal to or greater than supposed by lending the vehicle 10 to a user is low.

On the other hand, when the probability distribution of the load of the power storage device 15 in the car-sharing mode is L2, the load of the power storage device 15 can be said to be higher than in the owner mode. In this case, when no measure for particularly protecting the power storage device 15 in the car-sharing mode is taken, there is a high likelihood that the power storage device 15 will deteriorate earlier than in the owner mode.

In the vehicle 10 according to the first embodiment, when a parameter associated with progress of deterioration of the power storage device 15 during traveling of the vehicle 10 falls outside a predetermined range, a restraint process for restraining the progress of deterioration of the power storage device 15 is performed. When the car-sharing mode is set as the operation mode and it is predicted that the number of times in which the parameter falls outside the predetermined range is higher than in the owner mode, the control device 19 sets the predetermined range to be narrower than when the owner mode is set as the operation mode. In the vehicle 10, when it is predicted that the number of times in which the parameter falls outside the predetermined range in the car-sharing mode is higher than in the owner mode, the restraint process for restraining the progress of deterioration of the power storage device 15 is more likely to be performed than in the owner mode and thus it is possible to restrain the deterioration of the power storage device 15 due to driving of a person (a sharing user) other than the owner.

The control device 19 does not need to set the predetermined range to be narrower only when it is predicted that the number of times in which the parameter falls outside the predetermined range is higher than in the owner mode. For example, the control device 19 may set the predetermined range in the car-sharing mode to be narrower than in the owner mode regardless of the number of times in which the parameter falls outside the predetermined range. Accordingly, since the restraint process is more likely to be performed in the car-sharing mode than in the owner mode, it is possible to restrain deterioration of the power storage device 15 due to driving of a sharing user.

More specifically, in the vehicle 10 according to the first embodiment, the restraint process is a process of starting the engine 16A when a required power of the vehicle 10 exceeds a predetermined power range (between zero and the engine start threshold value). That is, excess of the required power over the predetermined power range corresponds to excess of the required power over the engine start threshold value. When the car-sharing mode is set as the operation mode and it is predicted that the number of times of excess of the required power over the predetermined power range is higher than in the owner mode, the control device 19 sets the predetermined power range to be narrower than when the owner mode is set as the operation mode. In the vehicle 10, since the engine 16A is more likely to be started in the car-sharing mode than in the owner mode and the load of the power storage device 15 is reduced due to a part of the required power being covered with the engine 16A, it is possible to restrain deterioration of the power storage device 15 due to driving of a person other than the owner.

Figure 4:
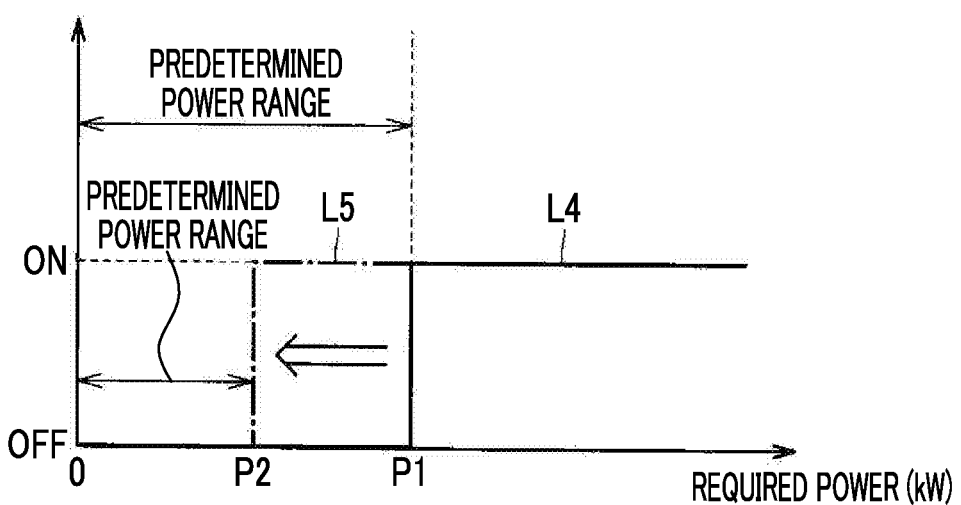
FIG. 4 is a diagram illustrating how a predetermined power range varies depending on a mode.

FIG. 4 is a diagram illustrating how the predetermined power range is changed depending on the mode (the owner mode or the car-sharing mode). Referring to FIG. 4, the horizontal axis represents the required power of the vehicle 10, and the vertical axis represents operation (ON) or stop (OFF) of the engine 16A.

An engine state change L4 denotes a state change of the engine 16A in the owner mode. In the owner mode, the control device 19 starts the engine 16A when the required power of the vehicle 10 is greater than P1. On the other hand, an engine state change L5 denotes the state change of the engine 16A in the car-sharing mode. In the car-sharing mode, the control device 19 starts the engine 16A when the required power of the vehicle 10 is greater than P2. P2 is a value less than P1.

The predetermined power range in which the engine 16A is maintained in a stopped state in the owner mode ranges from zero to P1, but the predetermined power range in the car-sharing mode ranges from zero to P2 (P2<P1). That is, the predetermined power range in the car-sharing mode is narrower than that in the owner mode. As a result, in the vehicle 10, since the engine 16A is more likely to be started in the car-sharing mode than in the owner mode and the load of the power storage device 15 is reduced, it is possible to restrain deterioration of the power storage device 15 due to driving of a person other than the owner.

Figure 5:
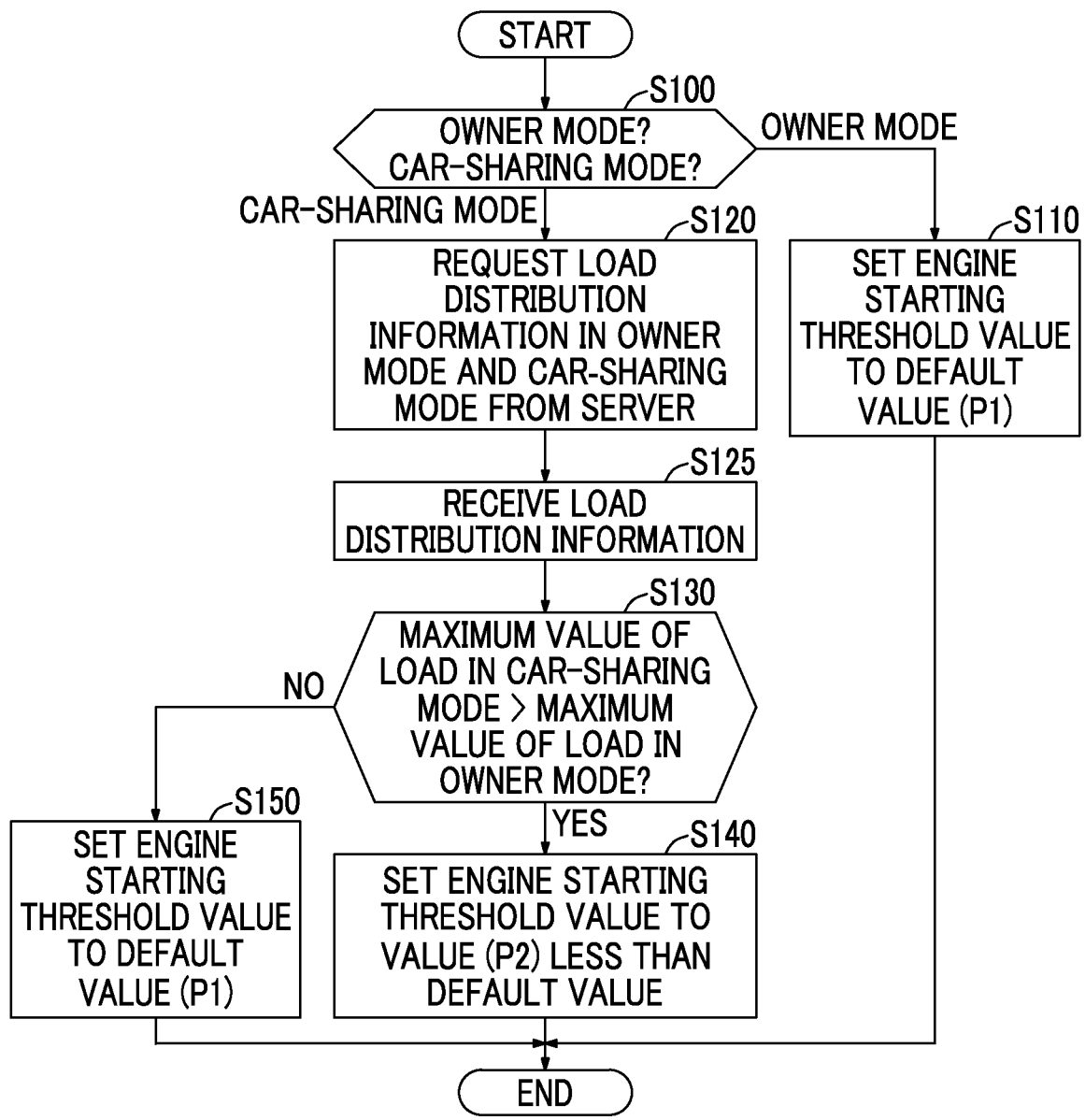
FIG. 5 is a flowchart illustrating a processing routine of determining a predetermined power range.

(Processing routine of determining predetermined power range) FIG. 5 is a flowchart illustrating a processing routine of determining the predetermined power range. The routine illustrated in the flowchart is performed when a vehicle system is started.

Referring to FIG. 5, the control device 19 determines which of the owner mode and the car-sharing mode is set as the operation mode of the host vehicle 11 with reference to the internal memory (Step S100). When it is determined that the owner mode is set as the operation mode of the host vehicle 11 ("owner mode" in Step S100), the control device 19 sets the engine start threshold value to a default value (P1 (FIG. 4)) (Step S110). That is, the control device 19 sets the predetermined power range to range from zero to P1.

On the other hand, when it is determined the car-sharing mode is set as the operation mode of the host vehicle 11 ("car-sharing mode" in Step S100), the control device 19 controls the communication device 17 such that a data request for requesting load distribution information in the owner mode and the car-sharing mode is transmitted to the server 30 (Step S120).

As described above, the server 30 analyzes the probability distributions of the load of the power storage devices 15 in the car-sharing mode, for example, with reference to the result data of the vehicles 10. As a result, for example, a probability distribution such as the probability distribution L1 or L2 illustrated in FIG. 3 is derived. The server 30 analyzes the probability distribution of the load of the power storage device 15 in the owner mode of the host vehicle 11, for example, with reference to the result data in the owner mode of the host vehicle 11. As a result, a probability distribution such as the probability distribution L3 illustrated in FIG. 3 is derived.

Thereafter, the control device 19 receives load distribution information in the owner mode and the car-sharing mode, which is transmitted from the server 30 in response to the data request, from the server 30 via the communication device 17 (Step S125).

The control device 19 determines whether a maximum value (for example, I2 in case of L2 and I1 in case of L1 in FIG. 3) of the load indicated by the received load distribution information in the car-sharing mode is greater than a maximum value (for example, I3 in case of L3 in FIG. 3)) of the load indicated by the received load distribution information in the owner mode of the host vehicle 11 (Step S130).

When it is determined that the maximum value of the load in the car-sharing mode is greater than the maximum value of the load in the owner mode (YES in Step S130), the number of times of excess of the required power over the predetermined power range in the car-sharing mode is larger than that in the owner mode and thus the control device 19 sets the engine start threshold value to a value (P2 (FIG. 4)) less than the default value (Step S140). That is, the control device 19 sets the predetermined power range to range from zero to P2 (which is narrower than a range of zero to P1).

When it is determined that the maximum value of the load in the car-sharing mode is equal to or less than the maximum value of the load in the owner mode (NO in Step S130), the number of times of excess of the required power over the predetermined power range in the car-sharing mode is smaller than that in the owner mode and thus the control device 19 sets the engine start threshold value to the default value (P1 (FIG. 4)) (Step S150). That is, the control device 19 maintains the predetermined power range in the owner mode (from zero to P1 (Step S110)). In other words, when it is predicted that the number of times of departure (excess) of the required power from (over) the predetermined power range in the car-sharing mode is smaller than that in the owner mode, the predetermined power range in the owner mode is maintained even in the car-sharing mode. Accordingly, in the vehicle 10, it is possible to reduce a negative influence of excessive protection of the power storage device 15 on operability of the vehicle 10.

As described above, in the vehicle 10 according to the first embodiment, when a parameter associated with progress of deterioration of the power storage device 15 falls outside a predetermined range (the predetermined power range) during traveling of the vehicle 10, the control device 19 performs a restraint process (an engine starting process) for restraining progress of deterioration of the power storage device 15. When the car-sharing mode is set as the operation mode and it is predicted that the number of times in which the parameter falls outside the predetermined range is larger than that in the owner mode, the control device 19 sets the predetermined range to be narrower than when the owner mode is set as the operation mode. In the vehicle 10, since the restraint process for restraining the progress of deterioration of the power storage device 15 is more likely to be performed in the car-sharing mode than in the owner mode and thus it is possible to restrain deterioration of the power storage device 15 due to driving of a person other than the owner.

First Modified Example

In the first embodiment, the engine 16A is started to restrain the progress of deterioration of the power storage device 15 and the engine start threshold value (the predetermined power range) is changed depending on which of the owner mode and the car-sharing mode is set as the operation mode of the vehicle 10. In a first modified example of the first embodiment, an input/output power of the power storage device 15 is restrained to restrain the progress of deterioration of the power storage device 15 and a threshold value (a predetermined temperature range) for starting restraint of the input/output power is changed depending on which of the owner mode and the car-sharing mode is set as the operation mode of the vehicle 10.

Figure 6:
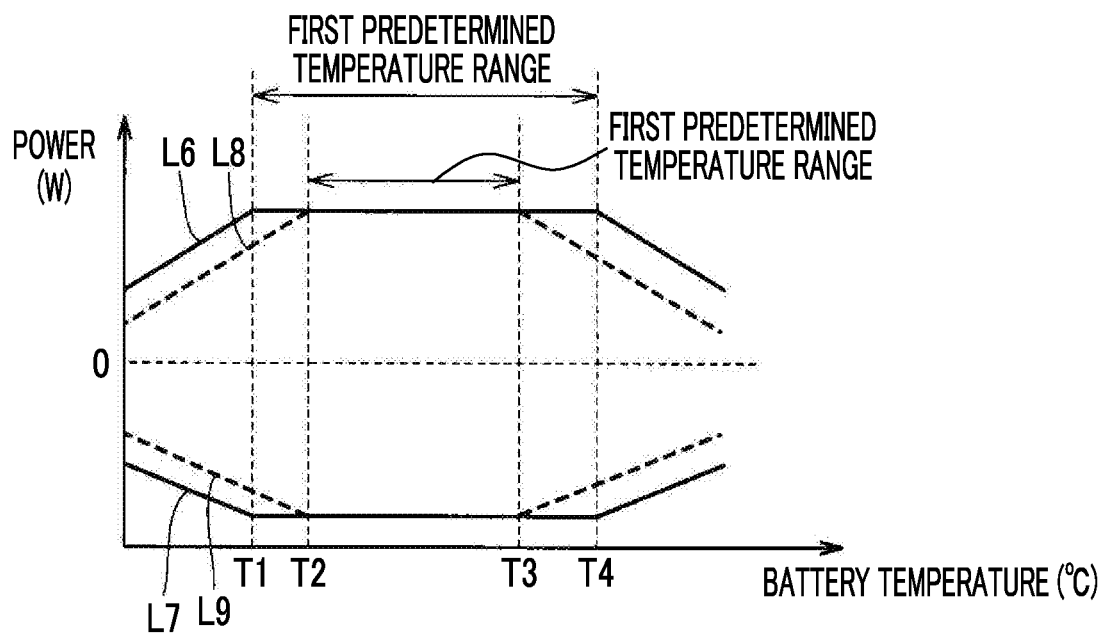
FIG. 6 is a diagram illustrating how a first predetermined temperature range varies depending on a mode in a first modified example.

FIG. 6 is a diagram illustrating how a first predetermined temperature range changes depending on the mode (the owner mode or the car-sharing mode) in the first modified example. Referring to FIG. 6, the horizontal axis represents the temperature of the power storage device 15, and the vertical axis represents the input/output power of the power storage device 15. The output power in the vertical axis is represented as a positive value, and the input power is represented as a negative value.

An output power change L6 and an input power change L7 denote upper limit values of the output power and the input power in the owner mode. In the owner mode, the first predetermined temperature range ranges from temperature T1 to temperature T4, and the input/output power of the power storage device 15 is restrained when the temperature of the power storage device 15 falls outside the first predetermined temperature range.

On the other hand, an output power change L8 and an input power change L9 denote upper limit values of the output power and the input power in the car-sharing mode. In the car-sharing mode, the first predetermined temperature range ranges from temperature T2 to temperature T3, and the input/output power of the power storage device 15 is restrained when the temperature of the power storage device 15 falls outside the first predetermined temperature range. Here, the temperature T2 is higher than the temperature T1, and the temperature T3 is lower than the temperature T4. That is, in the first modified example, the first predetermined temperature range is set to be narrower in the car-sharing mode than in the owner mode.

Accordingly, in the vehicle 10 according to the first modified example, since restraint of the input/output power is started earlier in the car-sharing mode than in the owner mode and the load of the power storage device 15 is reduced, it is possible to restrain deterioration of the power storage device 15 due to driving of a person other than the owner.

The server 30 analyzes probability distributions of the temperatures of the power storage devices 15 in the car-sharing mode, for example, with reference to the result data of the vehicles 10. The server 30 analyzes a probability distribution of the temperature of the power storage device 15 in the owner mode of the host vehicle 11, for example, with reference to the result data in the owner mode of the host vehicle 11. When it is predicted that the number of times in which the temperature of the power storage device 15 falls outside the first predetermined temperature range in the car-sharing mode is smaller than that in the owner mode with reference to the analysis result of the server 30, the control device 19 maintains the first predetermined temperature range in the owner mode even in the car-sharing mode. Accordingly, with the vehicle 10, it is possible to reduce a negative influence of excessive protection of the power storage device 15 on the operability of the vehicle 10 and the like.

Second Modified Example

In a second modified example of the first embodiment, the power storage device 15 is cooled to restrain the progress of deterioration of the power storage device 15 and a temperature (a second predetermined temperature range) at which cooling of the power storage device 15 is started is changed depending on which of the owner mode and the car-sharing mode is set as the operation mode of the vehicle 10.

Figure 7:
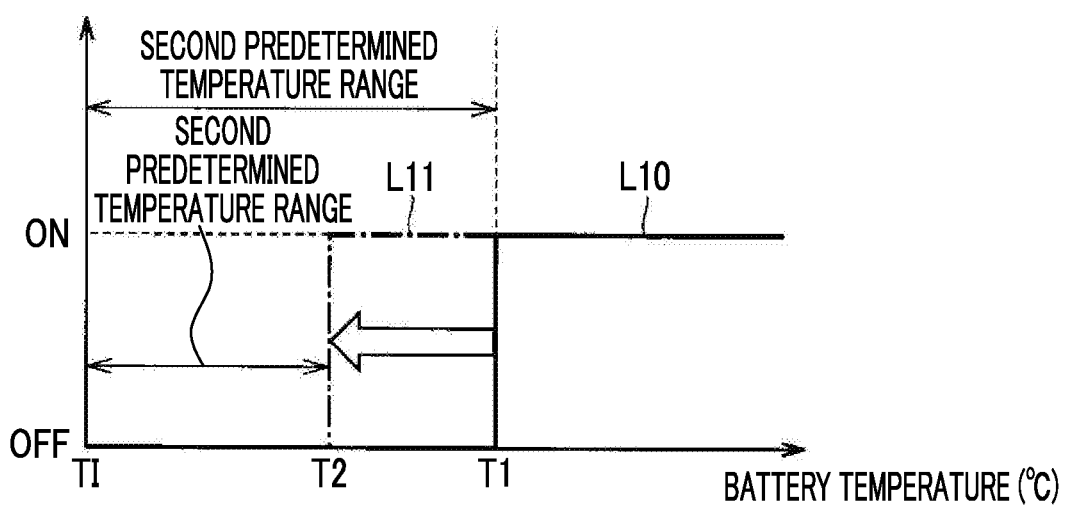
FIG. 7 is a diagram illustrating how a second predetermined temperature range varies depending on a mode in a second modified example.

FIG. 7 is a diagram illustrating how a second predetermined temperature range changes depending on the mode (the owner mode or the car-sharing mode) in the second modified example. Referring to FIG. 7, the horizontal axis represents the temperature of the power storage device 15, and the vertical axis represents operation (ON) or stop (OFF) of the cooling device 105.

A cooling device state change L10 denotes a state change of the cooling device 105 in the owner mode. In the owner mode, when the temperature of the power storage device 15 is higher than T1, the control device 19 starts the cooling device 105 (switches the cooling device from OFF to ON). On the other hand, a cooling device state change L11 denotes a state change of the cooling device 105 in the car-sharing mode. In the car-sharing mode, when the temperature of the power storage device 15 is higher than T2, the control device 19 starts the cooling device 105 (switches the cooling device from OFF to ON). T2 has a value less than T1.

The second predetermined temperature range in which the cooling device 105 maintains a stopped state ranges from TI to T1 in the owner mode, and the second predetermined temperature range in the car-sharing mode ranges from TI to T2. That is, the second predetermined temperature range is narrower in the car-sharing mode than in the owner mode. As a result, in the vehicle 10, since cooling of the power storage device 15 is started earlier in the car-sharing mode than in the owner mode and the load of the power storage device 15 is reduced, it is possible to restrain deterioration of the power storage device 15 due to driving of a person other than the owner.

Similarly to the first modified example, the server 30 analyzes probability distributions of the temperatures of the power storage devices 15 in the car-sharing mode, for example, with reference to the result data of the vehicles 10. The server 30 analyzes a probability distribution of the temperature of the power storage device 15 in the owner mode of the host vehicle 11, for example, with reference to the result data in the owner mode of the host vehicle 11. When it is predicted that the number of times of excess of the temperature of the power storage device 15 over the second predetermined temperature range in the car-sharing mode is smaller than that in the owner mode with reference to the analysis result of the server 30, the control device 19 maintains the second predetermined temperature range in the owner mode even in the car-sharing mode. Accordingly, with the vehicle 10, it is possible to reduce a negative influence of excessive protection of the power storage device 15 on the operability of the vehicle 10 and the like.

Other Embodiments

The first embodiment and the modified examples thereof have been described above. However, the applicable range of the present disclosure is not limited thereto. An example of other embodiments will be described below.

For example, when a destination is registered in the navigation device 100 in the vehicle 10, it is considered that an SOC of the power storage device 15 is controlled using information of a scheduled traveling route (for example, information on geographical features). For example, when it is known in advance that the vehicle 10 will travel on an ascent after traveling a predetermined distance in scheduled traveling route, consumption of great electric power is predicted and thus power generation using the first MG 16B is performed such that the SOC of the power storage device 15 increases in advance. When it is known in advance that the vehicle 10 travels on a descent after traveling a predetermined distance in the scheduled traveling route, regeneration of great electric power is predicted and thus traveling using the electric power is actively performed such that the SOC of the power storage device 15 decreases in advance.

In the vehicle 10, for example, an upper limit value of an SOC increase of the power storage device 15 when an ascent is approached may be changed depending on which of the owner mode and the car-sharing mode is set as the operation mode. For example, since a likelihood that the power storage device 15 reaches a high SOC is lowered by restricting the SOC increase of the power storage device 15 in the car-sharing mode more than in the owner mode, deterioration of the power storage device 15 is restrained.

Figure 8:
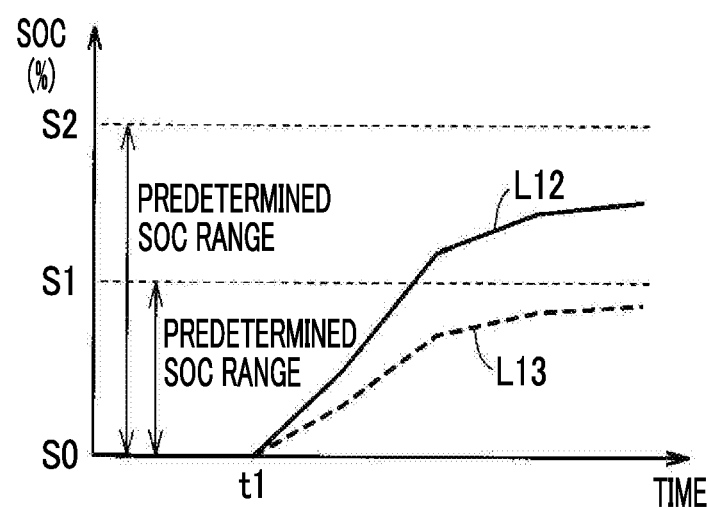
FIG. 8 is a diagram illustrating how an upper limit value of an SOC increase when an ascent is approached varies depending on a mode in another embodiment.

FIG. 8 is a diagram illustrating how the upper limit value of the SOC increase when an ascent is approached varies depending on the mode (the owner mode or the car-sharing mode). Referring to FIG. 8, the horizontal axis represents time and the vertical axis represents an SOC.

An SOC change L12 denotes an SOC increase when an ascent is approached in the owner mode. An SOC change L13 denotes an SOC increase when an ascent is approached in the car-sharing mode.

In the owner mode, when it is predicted that the host vehicle 11 travels on an ascent after traveling a predetermined distance at time t1, the SOC of the power storage device 15 increases in a range in which the SOC increase is less than S2 by performing power generation using the first MG 16B. On the other hand, in the car-sharing mode, when it is predicted that the host vehicle 11 travels on an ascent after traveling a predetermined distance at time t1, the SOC of the power storage device 15 increases in a range in which the SOC increase is less than S1 by performing power generation using the first MG 16B. S1 has a value less than S2.

A predetermined SOC range which is an SOC range in which the SOC can increase before the vehicle travels on the ascent in the owner mode ranges from S0 to S2, the predetermined SOC range in the car-sharing mode ranges from S0 to S1. That is, in the car-sharing mode, the predetermined SOC range is narrower than in the owner mode. As a result, in the vehicle 10, since the SOC increase before the vehicle travels the ascent is restricted in the car-sharing mode more than in the owner mode and a likelihood that the power storage device 15 will reach a high SOC is lowered, it is possible to restrain deterioration of the power storage device 15.

In the first embodiment and the modified examples thereof, the probability distribution of the load (squares of current values) of the power storage device 15 or the probability distribution of the temperature of the power storage device 15 has been calculated by the server 30. However, the probability distribution is not necessarily calculated by the server 30, but may be calculated, for example, by the vehicle 10. In this case, in the vehicle 10, the result data of the power storage device 15 in the owner mode and the car-sharing mode is received from the server 30 and the probability distributions are calculated based on the received result data.

In the first embodiment, comparison (Step S130 in FIG. 5) of the maximum value of the load indicated by the load distribution information in the car-sharing mode with the maximum value of the load indicated by the load distribution information in the owner mode has been performed by the vehicle 10, but the comparison may be performed, for example, by the server 30. In this case, the load distribution information in the car-sharing mode and the owner mode is not transmitted from the server 30 to the vehicle 10, the comparison is performed by the server 30, and the comparison result (in which mode the maximum value of the load is greater) is transmitted from the server 30 to the vehicle 10. In the vehicle 10, the engine start threshold value is set depending on the received comparison result.

In the first embodiment, the probability distribution of the load of the power storage device 15 in the car-sharing mode has been analyzed with reference to the result data in the car-sharing mode of the vehicles 10. However, the method of analyzing the probability distribution of the load of the power storage device 15 is not limited thereto. For example, the control device 32 may analyze the probability distribution of the load of the power storage device 15 in the car-sharing mode with reference to only the result data when a sharing user to which the owner lends the host vehicle 11 drove the vehicle in the past.

In the first embodiment and the modified examples thereof, the vehicle 10 is normally connected to the network. However, the vehicle 10 is not necessarily normally connected to the network. The vehicle 10 may be, for example, a vehicle which can communicate with the server 30 if necessary.

In the first embodiment and the modified examples thereof, the vehicle 10 is a PHV. However, the vehicle 10 is not necessarily a PHV. For example, the vehicle 10 in the first embodiment may be a hybrid vehicle (HV), or the vehicle 10 in the first and second modified examples may be an electric vehicle (EV) or a hybrid vehicle.

It should be understood that the embodiment disclosed herein is exemplary in all regards but is not restrictive. The scope of the present disclosure is not limited to description of the above-mentioned embodiment but is defined by the appended claims, and is intended to include all modifications within meanings and scopes equivalent to the claims.

What is claimed is:

1. A motor-driven vehicle that is able to set one of a first mode in which an owner of the vehicle serves as a user and a second mode in which a person other than the owner serves as the user as an operation mode, the motor-driven vehicle comprising:
   a power storage device; and
   a control device configured to perform a restraint process for restraining progress of deterioration of the power storage device when a parameter associated with the progress of deterioration of the power storage device falls outside a predetermined range during traveling of the motor-driven vehicle, wherein the control device sets the predetermined range to be narrower when the second mode is set as the operation mode than when the first mode is set as the operation mode, and the control device maintains the predetermined range set in the first mode when the second mode is set as the operation mode if it is predicted that the number of times in which the parameter will fall outside the predetermined range is less when the second mode is set as the operation mode than when the first mode is set as the operation mode.

2. The motor-driven vehicle according to claim 1, further comprising an engine, wherein:
   the parameter is a required power of the motor-driven vehicle;
   the restraint process is a process of activating the engine when the required power exceeds a predetermined power range; and
   the control device sets the predetermined power range to be narrower when the second mode is set as the operation mode than when the first mode is set as the operation mode.

3. The motor-driven vehicle according to claim 1, wherein the parameter is a temperature of the power storage device, wherein:
   the restraint process is a process of restraining an input/output power of the power storage device when the temperature of the power storage device falls outside a predetermined temperature range; and
   the control device sets the predetermined temperature range to be narrower when the second mode is set as the operation mode than when the first mode is set as the operation mode.

4. The motor-driven vehicle according to claim 1, further comprising a cooling device configured to cool the power storage device, wherein:
   the parameter is a temperature of the power storage device;
   the restraint process is a process of activating the cooling device when the temperature exceeds a predetermined temperature range; and
   the control device sets the predetermined temperature range to be narrower when the second mode is set as the operation mode than when the first mode is set as the operation mode.

5. The motor-driven vehicle according to claim 1, wherein:
   the parameter is an amount of increase of an SOC of the power storage device;
   the restraint process is a process of restricting the amount of increase of the SOC within a predetermined range of the amount of increase of the SOC; and
   the control device sets the predetermined range of the amount of increase of the SOC to be narrower when the second mode is set as the operation mode than when the first mode is set as the operation mode.

* * * * *